(12) United States Patent
Yanagidate

(10) Patent No.: US 10,056,684 B2
(45) Date of Patent: Aug. 21, 2018

(54) WIRELESS COMMUNICATION DEVICE, WIRELESS COMMUNICATION SYSTEM, AND COMPUTER READABLE STORAGE DEVICE

(71) Applicant: OLYMPUS CORPORATION, Tokyo (JP)

(72) Inventor: Masaharu Yanagidate, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 803 days.

(21) Appl. No.: 14/512,527

(22) Filed: Oct. 13, 2014

(65) Prior Publication Data

US 2015/0029056 A1  Jan. 29, 2015

Related U.S. Application Data

(63) Continuation of application No. PCT/JP2013/060731, filed on Apr. 9, 2013.

(30) Foreign Application Priority Data

May 10, 2012  (JP) ................................ 2012-108367

(51) Int. Cl.
*H01Q 3/26* (2006.01)
*H01Q 3/34* (2006.01)
(Continued)

(52) U.S. Cl.
CPC ............ *H01Q 3/2605* (2013.01); *H01Q 3/26* (2013.01); *H01Q 3/34* (2013.01); *H01Q 25/002* (2013.01); *H04B 7/086* (2013.01); *H04W 16/28* (2013.01)

(58) Field of Classification Search
CPC .. H01Q 3/2605; H01Q 3/2611; H01Q 25/002; H01Q 3/24; H01Q 3/26; H01Q 3/34
See application file for complete search history.

(56) References Cited

U.S. PATENT DOCUMENTS 5,739,788 A * 4/1998 Dybdal .................... H01Q 3/10
342/16
6,377,213 B1 * 4/2002 Odachi ..................... G01S 3/48
342/372
(Continued)

FOREIGN PATENT DOCUMENTS

CN  1488203 A  4/2004
CN  1210895 C  7/2005
(Continued)

OTHER PUBLICATIONS

International Search Report dated Jul. 16, 2013, issued in corresponding application No. PCT/JP2013/060731.
(Continued)

*Primary Examiner* — Cassi J Galt
(74) *Attorney, Agent, or Firm* — Westerman, Hattori, Daniels & Adrian, LLP

(57) ABSTRACT

A wireless communication device includes: a directional antenna configured to wirelessly receive data from the wireless communication device which is a connection partner; a processing unit configured to perform a first detection process of controlling a directivity direction of the directional antenna and detecting a first direction which is a direction of a radio wave generation source other than the wireless communication device and a second detection process of controlling the directivity direction of the directional antenna and detecting a second direction which is a direction of the wireless communication device; and a control unit configured to set a directivity angle of the directional antenna to a narrower angle when the second (Continued)

detection process is performed by setting the directivity direction of the directional antenna in a vicinity of the first direction.

12 Claims, 9 Drawing Sheets

(51) Int. Cl.
*H01Q 25/00* (2006.01)
*H04B 7/08* (2006.01)
*H04W 16/28* (2009.01)

(56) References Cited

U.S. PATENT DOCUMENTS

| | | | | |
|---|---|---|---|---|
| 6,473,036 B2* | 10/2002 | Proctor, Jr. | ............ | H01Q 1/246 342/372 |
| 6,509,865 B2* | 1/2003 | Takai | ............ | H01Q 1/246 342/14 |
| 6,934,538 B1* | 8/2005 | Sakaguchi | ............ | H04W 88/02 455/226.4 |
| 7,046,965 B2* | 5/2006 | Maeda | ............ | H01Q 1/246 342/367 |
| 7,146,170 B2* | 12/2006 | Davidson | ............ | H01Q 1/246 455/412.1 |
| 8,493,901 B2* | 7/2013 | Aoki | ............ | H01Q 3/30 370/310 |
| 9,147,935 B2* | 9/2015 | Keidar | ............ | H01Q 1/245 |
| 2002/0181492 A1* | 12/2002 | Kasami | ............ | H04W 72/1257 370/445 |
| 2003/0038748 A1 | 2/2003 | Henderson et al. | | |

FOREIGN PATENT DOCUMENTS

| | | |
|---|---|---|
| EP | 1 337 047 A2 | 8/2003 |
| JP | 2000-183796 A | 6/2000 |
| JP | 2001-223516 A | 8/2001 |
| JP | 2001-320219 A | 11/2001 |
| JP | 2002-232350 A | 8/2002 |
| JP | 2002-330094 A | 11/2002 |
| JP | 2003-18074 A | 1/2003 |
| JP | 2003-244060 A | 8/2003 |
| JP | 2005-525016 A | 8/2005 |
| JP | 2008-113450 A | 5/2008 |
| WO | 02/060092 A1 | 8/2002 |
| WO | 03/094285 A2 | 11/2003 |

OTHER PUBLICATIONS

Office Action dated Oct. 19, 2015, issued in counterpart Chinese Patent Application No. 201380023881.2 , with English translation. (16 pages).
Office Action dated Oct. 19, 2015, issued in counterpart Chinese Patent Application No. 201320023881.2, with English translation. (16 pages).
Extended European Search Report dated Dec. 21, 2015, issued in counterpart European Patent Application No. 13788610.7. (10 pages).

* cited by examiner

WIRELESS COMMUNICATION DEVICE, WIRELESS COMMUNICATION SYSTEM, AND COMPUTER READABLE STORAGE DEVICE

CROSS REFERENCE TO RELATED APPLICATIONS

This application is a continuation application based on a PCT Patent Application No. PCT/JP2013/060731 filed Apr. 9, 2013, whose priority is claimed on Japanese Patent Application No. 2012-108367, filed May 10, 2012, the entire content of which are hereby incorporated by reference.

BACKGROUND OF THE INVENTION

Field of the Invention

The present invention relates to technology for performing communication using space division multiple access (SDMA) in which communication is performed by selecting a connection partner from among a plurality of wireless communication devices within the same space using directivity of a directional antenna.

Description of the Related Art

As a system for performing SDMA, an example in which a multi-beam antenna corresponding to the SDMA is used in a wireless base station of a wireless local area network (WLAN) is shown in Japanese Unexamined Patent Application, First Publication No. 2003-18074. In Japanese Unexamined Patent Application, First Publication No. 2003-18074, a process of suppressing interference waves to perform communication by monitoring the interference waves from a radio interference wave generation source, employing a non-directional beam pattern when there are no interference waves, and employing a beam pattern for suppressing the interference waves at the arrival time of the interference waves is disclosed.

SUMMARY

A wireless communication device according to a first aspect of the present invention is provided including: a directional antenna configured to wirelessly receive data from the wireless communication device which is a connection partner; a processing unit configured to perform a first detection process of controlling a directivity direction of the directional antenna and detecting a first direction which is a direction of a radio wave generation source other than the wireless communication device and a second detection process of controlling the directivity direction of the directional antenna and detecting a second direction which is a direction of the wireless communication device; and a control unit configured to set a directivity angle of the directional antenna to a narrower angle when the second detection process is performed by setting the directivity direction of the directional antenna in a vicinity of the first direction than when the second detection process is performed by setting the directivity direction of the directional antenna to a direction other than the vicinity of the first direction and control the directivity direction of the directional antenna to suppress an influence of radio waves from the radio wave generation source at the time of receiving the data when the second direction is the vicinity of the first direction.

In addition, according to a second aspect of the present invention, in the wireless communication device according to the first aspect, the directional antenna wirelessly receives image data from the wireless communication device in every predetermined cycle, and the processing unit performs the first or second detection process in an idle period in which the reception of the image data is paused for every predetermined cycle.

In addition, according to a third aspect of the present invention, in the wireless communication device according to the first aspect, when the detected second direction is the vicinity of the first direction after the first and second detection processes are performed at least once, the processing unit increases a frequency at which the first or second detection process is performed more than when the detected second direction is a direction other than the vicinity of the first direction.

In addition, according to a fourth aspect of the present invention, the wireless communication device according to the first aspect further includes: a movement detection unit configured to detect movement of its own device and output a movement signal according to the movement, wherein the processing unit calculates a movement amount of the own device based on the movement signal after the first and second detection processes are performed at least once and performs the first or second detection process when the movement amount has exceeded a predetermined amount.

In addition, according to a fifth aspect of the present invention, in the wireless communication device according to the fourth aspect, when the detected second direction is the vicinity of the first direction, the processing unit sets the predetermined amount to a smaller amount than when the detected second direction is a direction other than the vicinity of the first direction.

In addition, according to a sixth aspect of the present invention, in the wireless communication device according to the fourth aspect, the processing unit calculates a variation amount of a direction of the own device based on the movement signal after the first and second detection processes are performed at least once, and uses the calculated variation amount for setting a detection range in the first or second detection process.

In addition, according to a seventh aspect of the present invention, the wireless communication device according to the first aspect further includes: a movement detection unit configured to detect movement of its own device and output a movement signal according to the movement, wherein the processing unit calculates a variation amount of the directivity direction of the directional antenna based on the movement signal after the first and second detection processes are performed at least once and corrects the directivity direction of the directional antenna when the variation amount has exceeded a predetermined amount.

In addition, according to an eighth aspect of the present invention, in the wireless communication device according to the first aspect, when the detected second direction is the vicinity of the first direction, the control unit further narrows a directivity angle of the directional antenna at the time of receiving the data to a narrower angle than when the detected second direction is a direction other than the vicinity of the first direction.

In addition, according to a ninth aspect of the present invention, in the wireless communication device according to the first aspect, the control unit sets the directivity direction of the directional antenna to a direction away from the first direction in a range in which the detected second direction is not deviated from a half-value angle of the directional antenna at the time of receiving the data when the detected second direction is the vicinity of the first direction.

In addition, according to a tenth aspect of the present invention, the wireless communication device according to the first aspect further includes: a warning unit configured to issue a warning when the detected second direction is the vicinity of the first direction.

In addition, according to an eleventh aspect of the present invention, a wireless communication system is provided including: a first wireless communication device having a first directional antenna configured to wirelessly transmit data; and a second wireless communication device having a second directional antenna configured to wirelessly receive data from the first wireless communication device; a processing unit configured to perform a first detection process of controlling a directivity direction of the second directional antenna and detecting a first direction which is a direction of a radio wave generation source other than the first wireless communication device and a second detection process of controlling the directivity direction of the second directional antenna and detecting a second direction which is a direction of the first wireless communication device; and a control unit configured to set a directivity angle of the second directional antenna to a narrower angle when the second detection process is performed by setting the directivity direction of the second directional antenna in a vicinity of the first direction than when the second detection process is performed by setting the directivity direction of the second directional antenna to a direction other than the vicinity of the first direction and control the directivity direction of the second directional antenna to suppress an influence of radio waves from the radio wave generation source at the time of receiving the data when the second direction is the vicinity of the first direction.

In addition, according to a twelfth aspect of the present invention, an antenna control method is provided including: performing a first detection process of controlling a directivity direction of a directional antenna configured to wirelessly receive data from a wireless communication device which is a connection partner and detecting a first direction which is a direction of a radio wave generation source other than the wireless communication device and a second detection process of controlling the directivity direction of the directional antenna and detecting a second direction which is a direction of the wireless communication device; and setting a directivity angle of the directional antenna to a narrower angle when the second detection process is performed by setting the directivity direction of the directional antenna in a vicinity of the first direction than when the second detection process is performed by setting the directivity direction of the directional antenna to a direction other than the vicinity of the first direction and controlling the directivity direction of the directional antenna to suppress an influence of radio waves from the radio wave generation source at the time of receiving the data when the second direction is the vicinity of the first direction.

In addition, according to a thirteenth aspect of the present invention, a computer readable storage device saving a computer program is provided for causing a computer of a wireless communication device having a directional antenna configured to wirelessly receive data from a wireless communication device which is a connection partner to: execute a first detection process of controlling a directivity direction of the directional antenna and detecting a first direction which is a direction of a radio wave generation source other than the wireless communication device; and a second detection process of controlling the directivity direction of the directional antenna and detecting a second direction which is a direction of the wireless communication device, and set a directivity angle of the directional antenna to a narrower angle when the second detection process is performed by setting the directivity direction of the directional antenna in a vicinity of the first direction than when the second detection process is performed by setting the directivity direction of the directional antenna to a direction other than the vicinity of the first direction and control the directivity direction of the directional antenna to suppress an influence of radio waves from the radio wave generation source at the time of receiving the data when the second direction is the vicinity of the first direction.

DETAILED DESCRIPTION OF THE PREFERRED EMBODIMENTS

Figure 1:
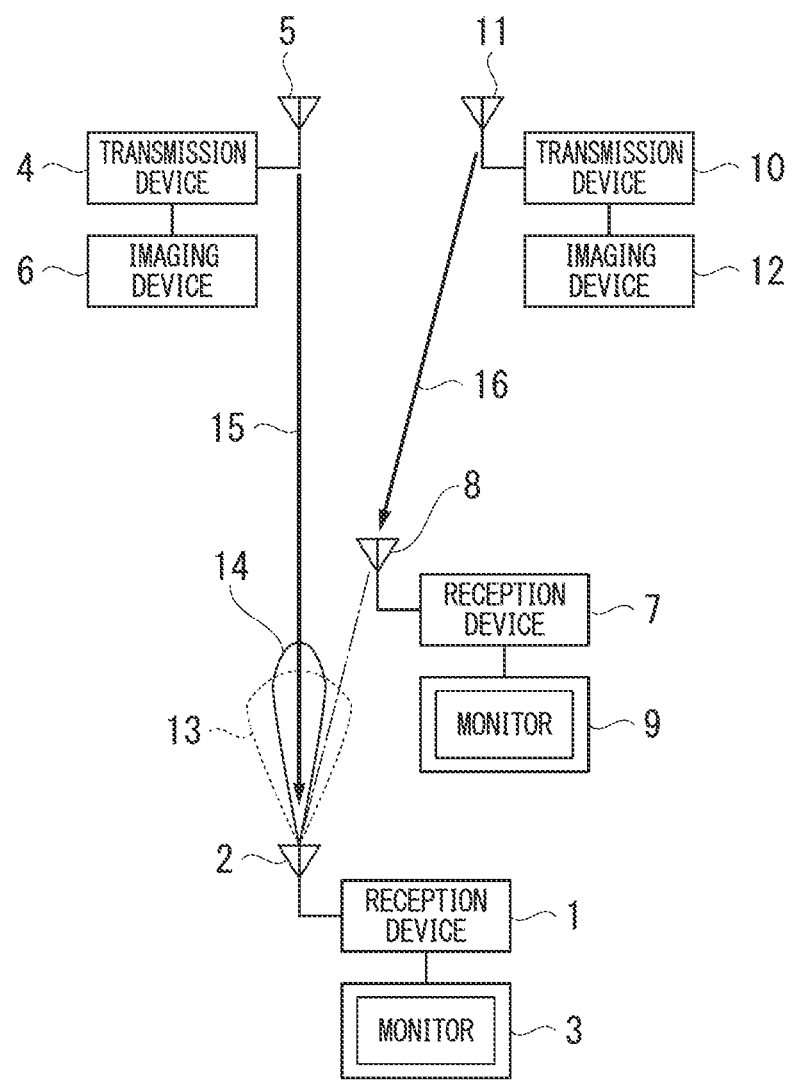
FIG. 1 is a block diagram illustrating a configuration of an image communication system according to an embodiment of the present invention.

Hereinafter, an embodiment of the present invention will be described with reference to the drawings. In this embodiment, an example in which the present invention is applied to an image communication system obtained by combining two sets of image communication devices, each of which includes an imaging device configured to capture an image, a transmission device configured to transmit the captured image through wireless communication, a reception device configured to receive the wirelessly transmitted image, and a monitor configured to display the received image, will be described. In addition, although the wireless communication is normally performed in a three-dimensional space, description will be given using the case in which wireless communication is performed in a two-dimensional space for simplification of the description.

[System Configuration]

First, an outline of an image communication system will be described using FIG. 1. The image communication system illustrated in FIG. 1 includes two imaging transmission units (an imaging device 6/transmission device 4 and an imaging device 12/transmission device 10) and two reception display units (a reception device 1/monitor 3 and a reception device 7/monitor 9).

The imaging transmission unit and the reception display unit are connected in one-to-one correspondence, and a connection partner for transmitting/receiving data can be appropriately set. In this embodiment, the imaging transmission unit having the imaging device 6 and the transmission device 4 will be described as the imaging transmission unit connected to the reception display unit having the reception device 1 and the monitor 3, and the imaging transmission unit having the imaging device 12 and the transmission device 10 will be described as the imaging transmission unit connected to the reception display unit having the reception device 7 and the monitor 9.

In the image communication system of this embodiment, the reception device of the reception display unit serving as the connection partner receives image data wirelessly transmitted from the transmission device of each imaging transmission unit and the monitor displays an image based on the received image data. The transmission device and the reception device in this embodiment perform wireless communication of a predetermined cycle using the same frequency band. In addition, the transmission device and the reception device are equipped with an antenna, the directivity of which is variable, and radiation of radio waves for a device other than the connection partner is suppressed by directing the directivity direction to the connection partner. Thereby, SDMA for simultaneously performing a plurality of wireless communications using the same frequency band within the same space is implemented. The transmission device 4 is equipped with an antenna 5, the transmission device 10 is equipped with an antenna 11, the reception device 1 is equipped with an antenna 2, and the reception device 7 is equipped with an antenna 8.

In this embodiment, as illustrated in FIG. 1, the case in which the devices are arranged so that the direction of the transmission device 4 of the connection partner viewed from the reception device 1 and the direction of the transmission device 10 which is not the connection partner viewed from the reception device 1 become substantially the same direction will be described as an example. The antenna mounted on the transmission device and the reception device in this embodiment is a variable directional antenna including a plurality of antenna elements, and directivity is controlled according to phase control for each antenna element. Because details of the operation principle related to directivity control of the variable directional antenna are well known, description thereof will be omitted.

[Schematic Operation]

Before the initiation of communication of image data, the reception device performs a connection setup process of communicating information necessary for a connection by searching for the transmission device of the connection partner. After the connection setup process, the wireless communication of the image data is performed. In the wireless communication in this embodiment, a communication format in which image data of one screen from each transmission device is periodically transmitted and there is a transmission pause period of image data referred to as a blanking period between image data of one screen and image data of the next screen is performed. During the blanking period, if necessary, communication of various control signals other than the image data is performed.

The connection setup process to be performed for the reception device 1 to be connected to the transmission device 4 when each device has been arranged as in FIG. 1 will be described below. Initially, the reception device 1 searches for an interference radio wave generation source (radio wave interference source) other than the connection partner by setting the precision of directivity control of the antenna 2 to normal precision. In addition, interference source direction detection of measuring the direction of the transmission device 10 is performed by detecting the presence of the transmission device 10 which is not the connection partner. Subsequently, the reception device 1 transmits a response request signal to the transmission device 4 which is the connection partner while changing the directivity direction of the antenna 2 with the precision of the directivity control of the antenna 2 maintained in the normal precision, receives a response signal from the transmission device 4, and performs connection direction detection of detecting the direction of the transmission device 4. At this time, the transmission in the direction of the transmission device 10 is excluded when the transmission of the response request signal is performed.

Figure 2:
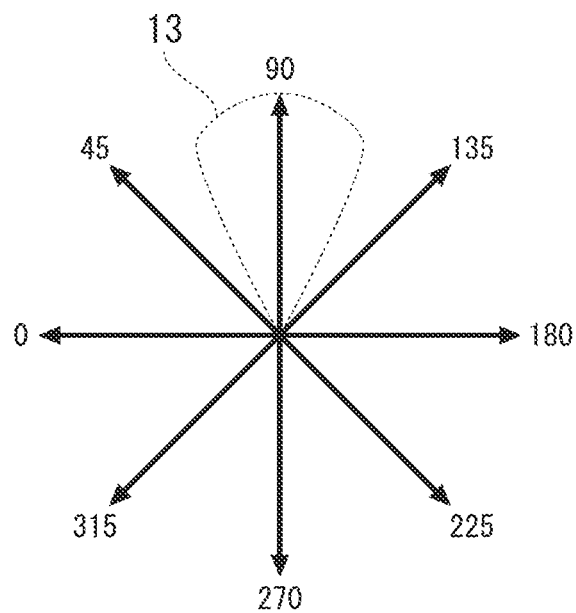
FIG. 2 is a reference diagram illustrating a directivity direction of an antenna in the image communication system according to the embodiment of the present invention.

FIG. 2 illustrates the directivity direction of the antenna 2 when the precision of the directivity control of the antenna 2 is normal. The antenna 8 mounted on the reception device 7 is also similar. However, the antenna 2 will be described. In this example, the directivity direction of the antenna 2 is set at 45-degree intervals. In this example, the left direction of the drawing is set as a reference direction (0 degrees) of the directivity direction and the angle of the directivity direction is set in the clockwise direction from the reference direction. Each directivity direction illustrated in FIG. 2 is a direction fixed on the antenna 2. For example, even when the directivity direction of the antenna 2 is fixed in a direction of 90 degrees of FIG. 2, the directivity direction of the antenna 2 for a space varies if the tilt of the antenna 2 varies according to movement of the reception device 1.

In FIG. 2, the precision of the directivity control of the antenna 2 is normal, and a directional pattern 13 when the directivity direction is set to the direction of 90 degrees is also illustrated. Because the directivity direction is set at 45-degree intervals as illustrated, the directivity angle of the directional pattern 13 is set to an angle which slightly exceeds 45 degrees.

In the interference source direction detection, the direction of the transmission device 10 is measured to be the direction of 90 degrees.

The direction of the transmission device 4 of the connection partner viewed from the reception device 1 is not the vicinity of the direction of the transmission device 10 which is not the connection partner viewed from the reception device 1. In this case, the direction of the transmission device 4 viewed from the reception device 1 is not included in a range of the directivity angle of the directional pattern when the directivity direction of the antenna 2 is set to the direction of the transmission device 10. In this case, the response request signal is transmitted in the direction of the transmission device 4 in the connection direction detection, and the detection of the direction of the transmission device 4 succeeds.

However, when each device is arranged as in FIG. 1, the direction of the transmission device 4 of the connection partner viewed from the reception device 1 and the direction of the transmission device 10 which is not the connection partner viewed from the reception device 1 are substantially the same direction (the direction of 90 degrees of FIG. 2). The direction of the transmission device 4 viewed from the reception device 1 is included in a range of the directivity angle of the directional pattern when the directivity direction of the antenna 2 is set to the direction of the transmission device 10.

In this case, because the response request signal is not transmitted in the direction of the transmission device 10, that is, the direction of the transmission device 4, the detection of the direction of the transmission device 4 fails in the connection direction detection. When the detection of the direction of the transmission device 4 has failed, the reception device 1 performs the search for the radio wave interference source again by setting the precision of the directivity control of the antenna 2 to high precision.

Figure 3:
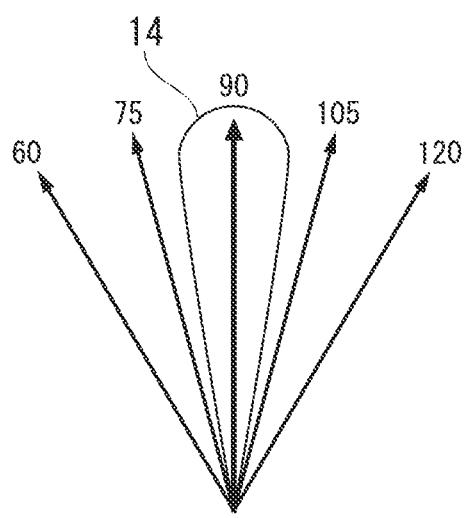
FIG. 3 is a reference diagram illustrating a directivity direction of the antenna in the image communication system according to the embodiment of the present invention.

FIG. 3 illustrates part of the directivity direction of the antenna 2 when the precision of the directivity control of the antenna 2 is high. Although the antenna 8 mounted on the reception device 7 is also similar, the antenna 2 will be representatively described. In this example, the directivity direction of the antenna 2 is set at 15-degree intervals. In this example, as in FIG. 2, the left direction of the drawing is set as the reference direction (0 degrees) of the directivity direction and the angle of the directivity direction is set in the clockwise direction from the reference direction. In addition, as in FIG. 2, each directivity direction illustrated in FIG. 3 is a direction fixed on the antenna 2.

In FIG. 3, the precision of the directivity control of the antenna 2 is high, and a directional pattern 14 when the directivity direction is set to the direction of 90 degrees is also illustrated. Because the directivity direction is set at 15-degree intervals as illustrated, the directivity angle of the directional pattern 14 is set to an angle which slightly exceeds 15 degrees. That is, the directivity angle when the precision of the directivity control of the antenna 2 is high is set to be narrower than the directivity angle when the precision of the directivity control of the antenna 2 is normal.

In the search for the radio wave interference source when the precision of the directivity control of the antenna 2 is set to high, the reception device 1 performs the search by setting the directivity direction of the antenna 2 in a range of the vicinity of a previous measurement result (90 degrees) based on the previous measurement result. Specifically, when the previous measurement result is 90 degrees, the directivity direction of the antenna 2 is set in a range from 60 degrees to 120 degrees. As a result of this search, the direction of the transmission device 10 is recognized to be the direction of 105 degrees of FIG. 3.

Subsequently, the reception device 1 performs the connection direction detection again with the precision of the directivity control of the antenna 2 set to high. As a result, when the directional pattern 14 at the time of setting the directivity direction to the direction of 90 degrees illustrated in FIG. 3 has been used, a response signal is received from the transmission device 4 and the detection of the direction of the transmission device 4 succeeds. Thereafter, the communication of connection information is performed between the transmission device 4 and the reception device 1 and the connection setup process ends.

After the connection setup process, communication of image data is performed. The detection (interference source direction detection) of the direction of the transmission device 10 which is the radio wave interference source and the detection (connection direction detection) of the direction of the transmission device 4 which is the connection partner are performed using the blanking period during the communication of the image data. The interference source direction detection and the connection direction detection are performed at two timings of the timing based on a predetermined cycle and the timing based on movement of the reception device 1 shown hereinafter.

In the interference source direction detection and the connection direction detection at the timing based on the predetermined cycle, the reception device 1 changes the cycle when the precision of the directivity control of the antenna 2 is normal and when the precision of the directivity control of the antenna 2 is high and executes high-precision detection in which the directional pattern is narrow in a short cycle. In the interference source direction detection and the connection direction detection at the timing based on movement of the reception device 1, the reception device 1 detects the movement of its own device based on the output of the acceleration sensor within the reception device 1 and executes the detection at a point in time at which the movement of a predetermined amount or more has been detected. In addition, the reception device 1 detects the variation of the direction of the antenna 2 based on the output of the acceleration sensor and also performs directivity control to offset the variation of the direction.

[Detailed Description]

Figure 4:
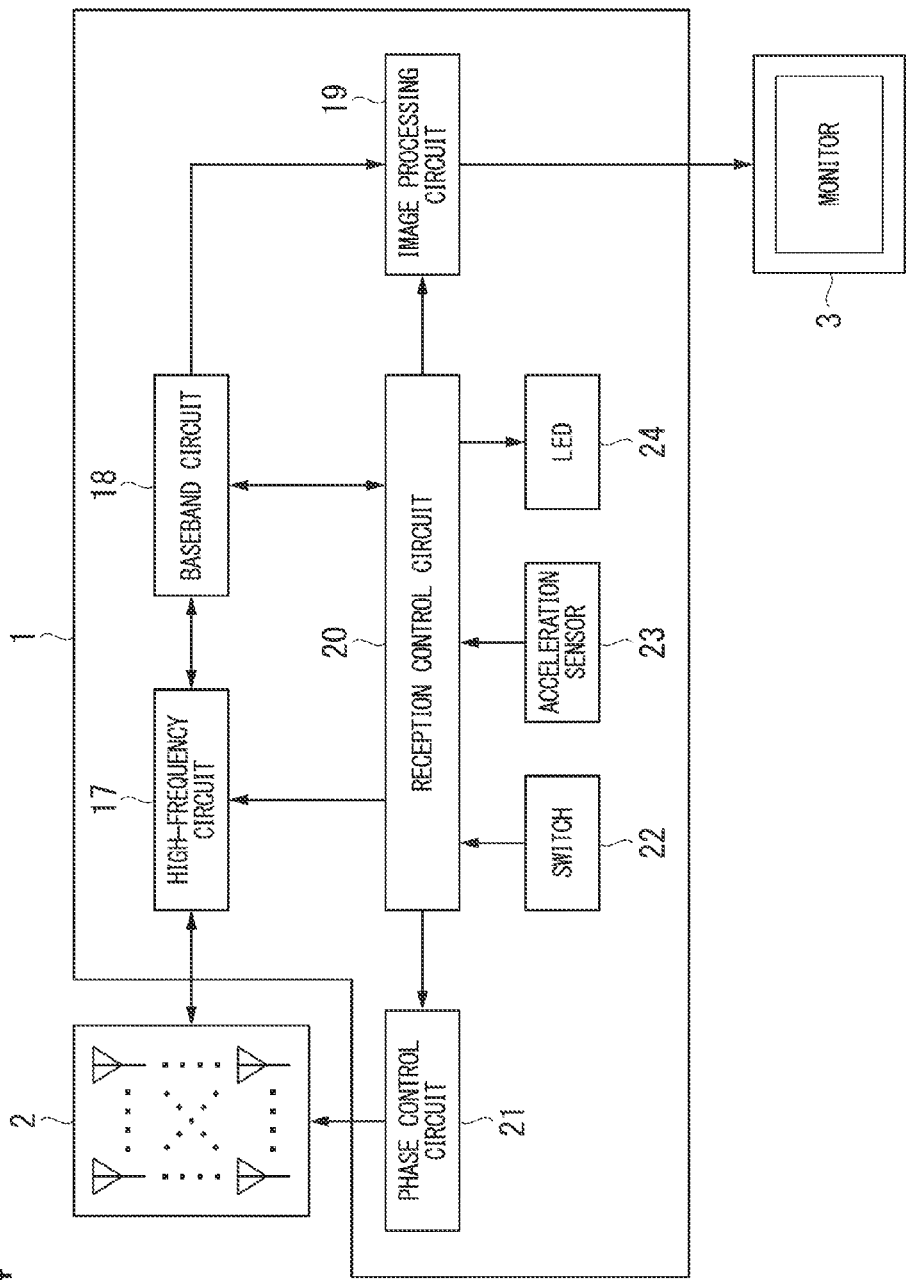
FIG. 4 is a block diagram illustrating a configuration of a reception device in the image communication system according to the embodiment of the present invention.

FIG. 4 illustrates the configuration of the reception device 1. Because the configuration of the reception device 7 is similar to the configuration of the reception device 1, the configuration of the reception device 1 will be representatively described. As illustrated in FIG. 4, the reception device 1 includes an antenna 2, a high-frequency circuit 17, a baseband circuit 18, an image processing circuit 19, a reception control circuit 20, a phase control circuit 21, an operation switch 22, an acceleration sensor 23, and a light emitting diode (LED) 24.

The high-frequency circuit 17 is connected to the antenna 2 and performs high-frequency processing. The baseband circuit 18 is connected to the high-frequency circuit 17 and performs baseband processing. The image processing circuit 19 performs image processing by receiving image data after the baseband processing from the baseband circuit 18, and outputs a signal after the image processing as a video signal to the monitor 3. The phase control circuit 21 controls directivity of the antenna 2. The reception control circuit 20 performs the above-described interference source direction detection and connection direction detection by controlling the overall operation of the reception device 1, and receives image data from the transmission device 4 which is the connection partner. In addition, if necessary, the reception control circuit 20 transmits control data by controlling each of the high-frequency circuit 17, the baseband circuit 18, and the phase control circuit 21. In addition, the reception control circuit 20 stores information of the transmission device 10 detected in the interference source direction detection or information of the transmission device 4 detected in the connection direction detection, a program for controlling the operation of the reception control circuit 20 or the like.

The operation switch 22 is a switch which can be operated by an operator, and delivers an instruction from the operator to the reception control circuit 20. The acceleration sensor 23 detects acceleration involved in the reception device 1 and outputs a signal according to a detection result to the reception control circuit 20. The LED 24 indicates an operation state of the reception device 1. For example, when results of the interference source direction detection and the connection direction detection represent that the radio wave interference source has been detected to be substantially in the same direction as the direction of the connection partner, the LED 24 performs the LED indication for a warning. With the precision of the directivity control of the antenna 2 when the radio wave interference source is present in substantially the same direction as the direction of the connection partner set to high, the reception control circuit 20 turns on the LED 24 when the directivity control is performed with high precision.

Figure 5:
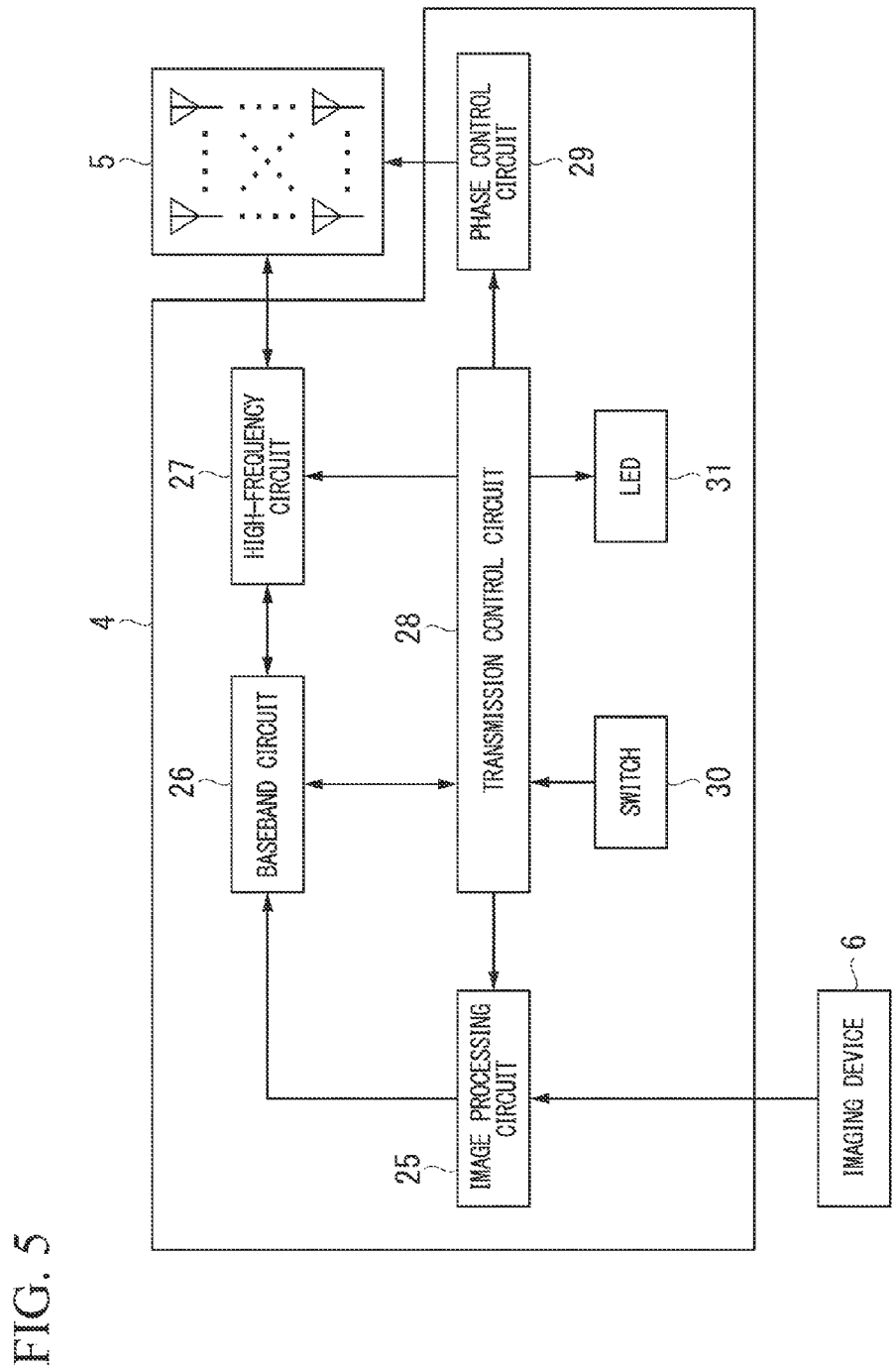
FIG. 5 is a block diagram illustrating a transmission device in the image communication system according to the embodiment of the present invention.

FIG. 5 illustrates a configuration of the transmission device 4. Because the configuration of the transmission device 10 is similar to the configuration of the transmission device 4, the configuration of the transmission device 4 will be representatively described. As illustrated in FIG. 5, the transmission device 4 includes an antenna 2, an image processing circuit 25, a baseband circuit 26, a high-frequency circuit 27, a transmission control circuit 28, a phase control circuit 29, an operation switch 30, and an LED 31.

The image processing circuit 25 performs image processing by receiving a video signal output from the imaging device 6 and outputs image data. The baseband circuit 26 performs baseband processing on the image data from the image processing circuit 25. The high-frequency circuit 27 performs high-frequency processing on the signal from the baseband circuit 26. The transmission control circuit 28 controls the overall operation of the transmission device 4. The phase control circuit 29 controls directivity of the antenna 5. The operation switch 30 is a switch capable of being operated by the operator, and delivers an instruction from the operator to the transmission control circuit 28. The LED 31 indicates an operation state of the transmission device 4.

Figure 6:
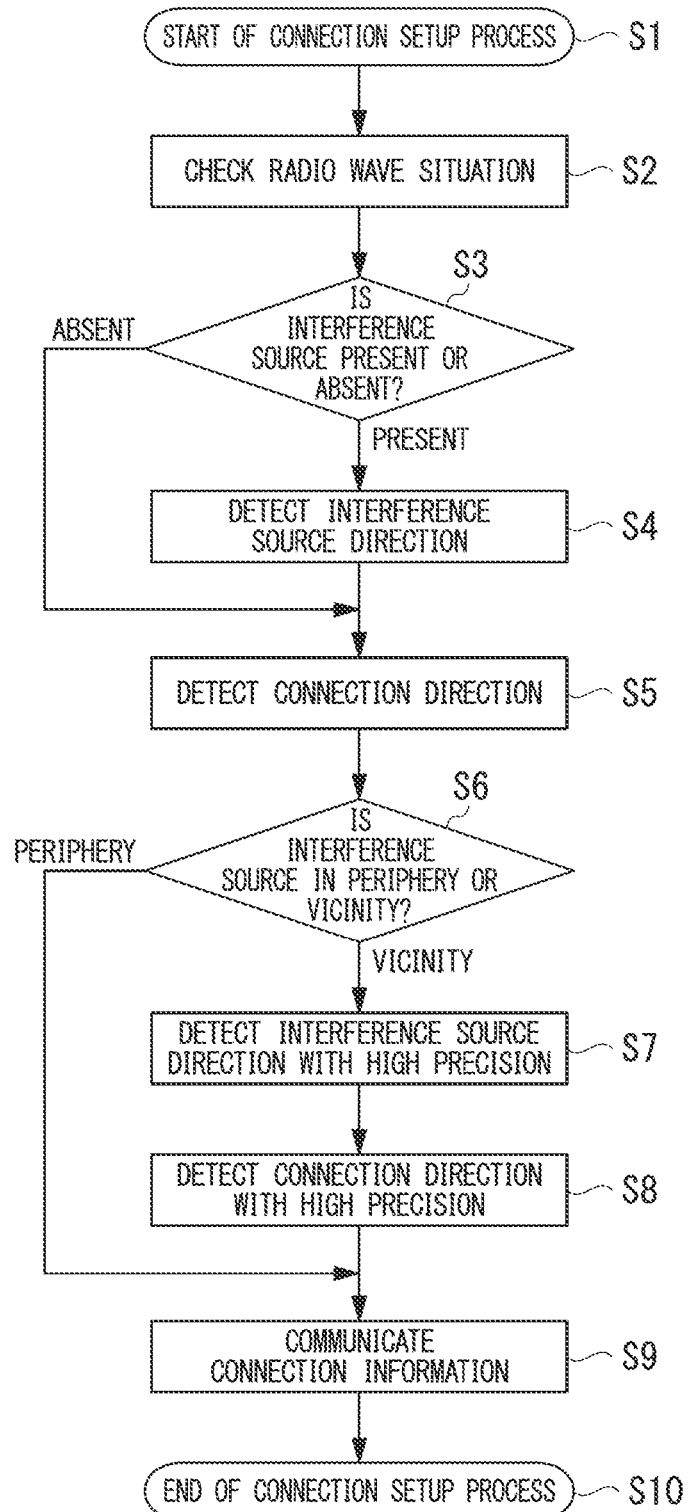
FIG. 6 is a flowchart illustrating a procedure of an operation of the reception device in the image communication system according to the embodiment of the present invention.

FIG. 6 illustrates a flow of a connection setup process in which the reception device 1 searches for the transmission device of the connection partner before the initiation of data communication and communicates connection information with its transmission device. Using FIG. 6, the connection setup process will be described in an example in which each device is arranged as in FIG. 1.

In a connection setup process S1, a radio wave situation check S2 is initially performed. The radio wave situation check S2 is a process of checking a communication environment (radio wave situation) of the reception device 1. At this point in time, the transmission device 4 which is the connection partner does not transmit radio waves and the radio waves received by the reception device 1 are radio waves from a device other than the transmission device 4. At this time, the reception control circuit 20 sets the antenna 2 to non-directivity via the phase control circuit 21 and measures the received radio waves.

Thereafter, the reception control circuit 20 performs a determination S3 of the presence/absence of the received radio waves based on a measurement result in the radio wave situation check S2. When there are received radio waves, the reception control circuit 20 performs interference source direction detection S4. In addition, when there are no received radio waves, the reception control circuit 20 performs connection direction detection S5.

The interference source direction detection S4 is a process of setting the precision of the directivity control of the antenna 2 to normal and detecting the direction of the radio wave interference source. In the interference source direction detection S4, the reception control circuit 20 sets the precision of the directivity of the antenna 2 to normal via the phase control circuit 21 and detects the direction and device information (identifier (ID)) of the transmission device which is not the connection partner by measuring the presence/absence of the received radio waves for every directivity direction while changing the directivity direction of the antenna 2 by a predetermined angle. In this embodiment, as described above, the directivity direction of the antenna 2 is set at 45-degree intervals. A measurement period for each directivity direction may be a period which exceeds a blanking period. In addition, the influence of the blanking period may be removed by performing measurement in the same directivity direction a plurality of times while performing the measurement by sequentially changing the directivity direction of the antenna 2.

When each device is arranged as in FIG. 1, the radio waves from the transmission device 10 are received by the reception device 1, and the direction of the transmission device 10 (a direction of 90 degrees: FIG. 2) is detected. Thereafter, the reception control circuit 20 performs the connection direction detection S5.

The connection direction detection S5 is a process of detecting the direction of the connection partner by setting the precision of the directivity control of the antenna 2 to normal. In the connection direction detection S5, the reception control circuit 20 controls the baseband circuit 18 and the high-frequency circuit 17 while changing the directivity direction of the antenna 2 by a predetermined angle (45 degrees) via the phase control circuit 21 and receives a response signal including the device information from the transmission device 4 by transmitting a response request signal to the transmission device 4 which is the connection partner as described above. Then, the reception control circuit 20 detects the directivity direction of the antenna 2 at the time of receiving the response signal as the direction of the transmission device 4. Because the transmission of the response request signal is performed with the exception of the direction (a direction of 90 degrees) of the transmission device 10 as described above, the detection of the direction of the transmission device 4 positioned in the same direction as that of the transmission device 10 fails.

Thereafter, the reception control circuit 20 makes an interference source position determination S6. The interference source position determination S6 is a process of determining whether the radio wave interference source is in the vicinity of the transmission device of the connection partner. When the detection of the direction of the transmission device of the connection partner has failed in the connection direction detection S5, the reception control circuit 20 determines that the radio wave interference source is in the vicinity of the transmission device of the connection partner. Upon determining that the radio wave interference source is in the vicinity of the transmission device of the connection partner in the interference source position determination S6, the reception control circuit 20 performs high-precision interference source direction detection S7.

The high-precision interference source direction detection S7 is a process of detecting the direction of the radio wave interference by setting the precision of the directivity control of the antenna 2 to high. In the high-precision interference source direction detection S7, the reception control circuit 20 sets the precision of the directivity of the antenna 2 to normal via the phase control circuit 21. In addition, the direction and device information of the transmission device which is not the connection partner are detected by measuring the presence/absence of received radio waves for every directivity direction while the directivity direction of the antenna 2 is changed by a predetermined angle. In this embodiment, as described above, the directivity direction of the antenna 2 is set at 15-degree intervals. When each device is arranged as in FIG. 1, the direction of the transmission device 10 is recognized to be a direction of 105 degrees of FIG. 3 in the high-precision interference source direction detection S7.

Subsequently, the reception control circuit 20 performs high-precision connection direction detection S8. The high-precision connection direction detection S8 is a process of detecting the direction of the connection partner with the precision of the directivity control of the antenna 2 set to high. In the high-precision connection direction detection S8, the reception control circuit 20 controls the baseband circuit 18 and the high-frequency circuit 17 while changing the directivity direction of the antenna 2 by a predetermined angle (15 degrees) via the phase control circuit 21 as described above. In addition, a response signal including device information is received from the transmission device 4 by transmitting the response request signal to the transmission device 4 which is the connection partner. Then, the reception control circuit 20 detects the directivity direction of the antenna 2 at the time of receiving the response signal as the direction of the transmission device 4. When each device is arranged as in FIG. 1, the direction of the transmission device 4 is recognized to be a direction of 90 degrees of FIG. 3.

Subsequently, the reception control circuit 20 performs connection information communication S9 with the transmission device 4 by directing the directional pattern in the direction of the transmission device 4 detected in the high-precision connection direction detection S8 via the phase control circuit 21.

At this time, the directional pattern 14 in FIGS. 1 and 3 is illustrated as the directional pattern. If the delivery of information necessary for a connection ends according to connection information communication S9, the connection setup process S1 ends (S10).

Figure 7:
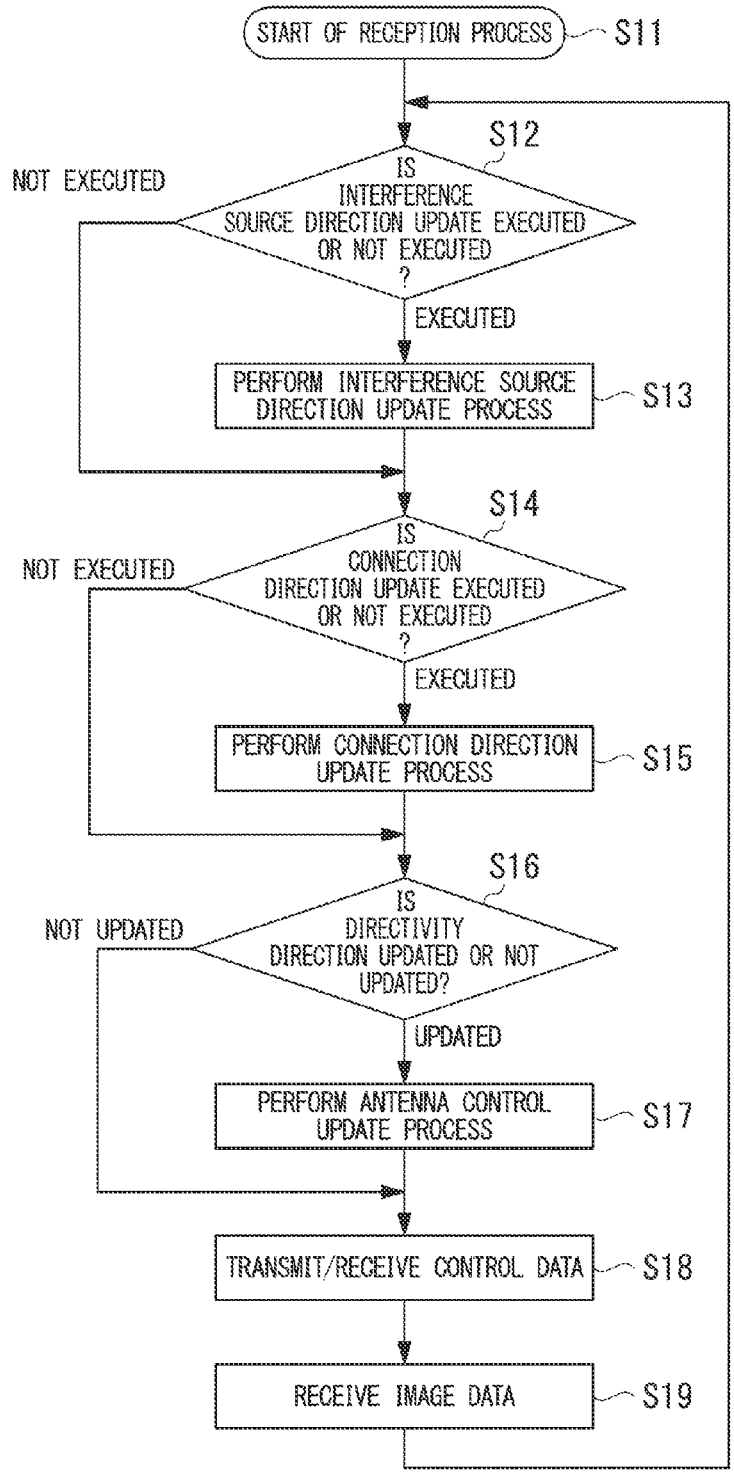
FIG. 7 is a flowchart illustrating a procedure of an operation of the reception device in the image communication system according to the embodiment of the present invention.

FIG. 7 illustrates a flow of a reception process to be performed by the reception device 1 after the connection setup process S1. Using FIG. 7, the reception process will be described in an example in which each device is arranged as in FIG. 1.

In the reception process S11, the reception device 1 receives image data from the transmission device 4 during a communication period of image data. During the blanking period, if necessary, the detection of the direction of the radio wave interference source or the connection partner is executed and the update of the directivity direction of the antenna 2 is performed. In the reception process S11, the reception control circuit 20 initially makes an interference source direction update determination S12 in the blanking period after an image data reception process S19 ends.

The interference source direction update determination S12 is a process of determining whether to execute the interference source direction update process S13. When a periodic interference source update instruction or a movement-time interference source update instruction is output, an instruction to execute the interference source direction update process S13 is issued as the result of the interference source direction update determination S12.

The periodic interference source update instruction is an instruction for executing the interference source direction update process S13 in a predetermined cycle determined based on a time measured by a built-in timer (not illustrated), and the execution cycle varies according to whether the precision of the directivity control of the antenna 2 is normal or high. Specifically, when the precision of the directivity control of the antenna 2 is high, the execution cycle is set so that the execution cycle is shorter (in other words, an execution frequency is higher) than when the precision of the directivity control of the antenna 2 is normal.

The movement-time interference source update instruction is an instruction to be output when the movement of the reception device 1 has been detected according to an acceleration sensor process. The acceleration sensor process will be described in detail using FIG. 8.

When the periodic interference source update instruction or the movement-time interference source update instruction is output, the reception control circuit 20 performs the interference source direction update process S13. The interference source direction update process S13 is a process of updating a search result by searching for the direction of the transmission device 10 which is a radio wave interference source. Because the search is performed based on the direction of the finally detected radio wave interference source in the interference source direction update process S13, the precision of the directivity control of the antenna 2 is different at the time of the search according to whether the precision of the directivity control of the antenna 2 is normal or high.

When each device is arranged as in FIG. 1, the antenna 2 performs directivity control with high precision and the direction of the radio wave interference source becomes 105 degrees of FIG. 3. In the interference source direction update process S13 of this state, the direction of the transmission device 10 is detected by setting the directivity direction to directions of 90 degrees, 105 degrees, and 120 degrees including directions of two angles adjacent to 105 degrees.

On the other hand, when the precision of the directivity control of the antenna 2 is normal, for example, when the direction of the radio wave interference source is 90 degrees of FIG. 2, the direction of the transmission device 10 is detected by setting the directivity direction to directions of 45 degrees, 90 degrees, and 135 degrees including directions of two angles adjacent to 90 degrees. However, when the direction of the radio wave interference source detected in the case in which the precision of the directivity control of the antenna 2 is normal is consistent with the direction of the connection partner which is being used in communication of image data, the direction of the radio wave interference source is detected again by changing the precision of the directivity control of the antenna 2 to high.

When neither the periodic interference source update instruction nor the movement-time interference update instruction is output, the interference source direction update process S13 is not executed. Subsequently, the reception control circuit 20 makes a connection direction update determination S14. The connection direction update determination S14 is a process of determining whether to execute a connection direction update process S15. Even in the connection direction update determination S14, as in the interference source direction update determination S12, the reception control circuit 20 makes a determination to execute the connection direction update process S15 when either the periodic connection partner update instruction in which an execution cycle varies according to whether the precision of the directivity control of the antenna 2 is normal or high or the movement-time connection partner update instruction to be output when the movement of the reception device 1 has been detected has been output.

The periodic connection partner update instruction is an instruction for executing the connection direction update process S15 in a predetermined cycle determined based on a time measured by a built-in timer (not illustrated), and the execution cycle varies according to whether the precision of the directivity control of the antenna 2 is normal or high. Specifically, when the precision of the directivity control of the antenna 2 is high, the execution cycle is set so that the execution cycle is shorter (in other words, an execution frequency is higher) than when the precision of the directivity control of the antenna 2 is normal.

The movement-time connection partner update instruction is an instruction to be output when the movement of the reception device 1 has been detected according to the acceleration sensor process. The acceleration sensor process will be described in detail using FIG. 8.

Like the interference source direction update process S13, the connection direction update process S15 is a process of updating a search result by searching for a direction of the connection partner based on the direction of the finally detected connection partner. The procedure is substantially the same as that of the interference source direction update process S13. However, when the direction of the connection partner detected when the precision of the directivity control of the antenna 2 is normal is consistent with the direction of the radio wave interference source, a process of re-detecting the direction of the connection partner by changing the precision of the directivity control of the antenna 2 to high is added. When neither the periodic connection partner update instruction nor the movement-time connection partner update instruction is output, the connection direction update process S15 is not executed.

When the directions of the connection partner and the radio wave interference source have been detected by setting the precision of the directivity control of the antenna 2 to high, the precision of the directivity control of the antenna 2 is changed to normal if the direction of the connection partner and the direction of the radio wave interference source can be separated at the normal precision. For example, when the direction of the connection partner in FIG. 3 is any of 75 degrees, 90 degrees, and 105 degrees and the direction of the radio wave interference source is any of 120 degrees, 135 degrees, and 150 degrees (not illustrated), the direction of the connection partner in FIG. 2 is 90 degrees and the direction of the radio wave interference source is 135 degrees. Thereby, it is determined that the direction of the connection partner and the direction of the radio wave interference source can be separated at the normal precision, and the precision of the directivity control of the antenna 2 is changed to normal.

When the precision of the directivity control of the antenna 2 is high, a warning indication by the LED 24 is performed as described above. When the precision of the directivity control of the antenna 2 becomes normal, the warning indication is released. Because the process other than the above in the connection direction update process S15 is the same as the process in the interference source direction update process S13, description thereof will be omitted.

When the interference source direction update process S13 and the connection direction update process S15 are executed according to an execution instruction (movement-time interference source update instruction or movement-time connection partner update instruction) generated in the acceleration sensor process, "data of a tilt angle variation amount" of the reception device 1 detected in the acceleration sensor process is used in the interference source direction update process S13 and the connection direction update process S15. Specifically, in a state in which data of a result of detecting the direction of the radio wave interference source is 105 degrees of FIG. 3, the interference source direction update process S13 is executed. At this time, when the "data of the tilt angle variation amount" is −15 degrees, the reception control circuit 20 determines that the reception device 1 has been tilted in the direction of −15 degrees and the direction of the radio wave interference source or the connection partner is detected in a search range of 105 degrees, 120 degrees, and 135 degrees including two adjacent directions around 120 degrees obtained by adding 15 degrees to 105 degrees from the original 105 degrees. Thereby, the processing time is shortened.

Subsequently, the reception control circuit 20 makes a determination S16 of the presence/absence of the directivity direction update process. When the direction of the connection partner has been updated as the result of the connection direction update process S15, the reception control circuit 20 executes an antenna control update process S17. In the antenna control update process S17, the reception control circuit 20 sets the directivity direction of the antenna 2 by updating a parameter related to the directivity control of the antenna 2 via the phase control circuit 21.

Subsequently, the reception control circuit 20 executes control data transmission/reception S18 which is performed during a blanking period and transmits/receives control data other than that described above. Because related control data other than that of antenna control is not related to the present invention, description thereof will be omitted.

When the blanking period ends, the reception control circuit 20 executes an image data reception process S19 to receive image data. In the blanking period after the reception of the image data ends, the interference source direction update determination S12 is made. Thereafter, the above-described sequence is iterated.

Figure 8:
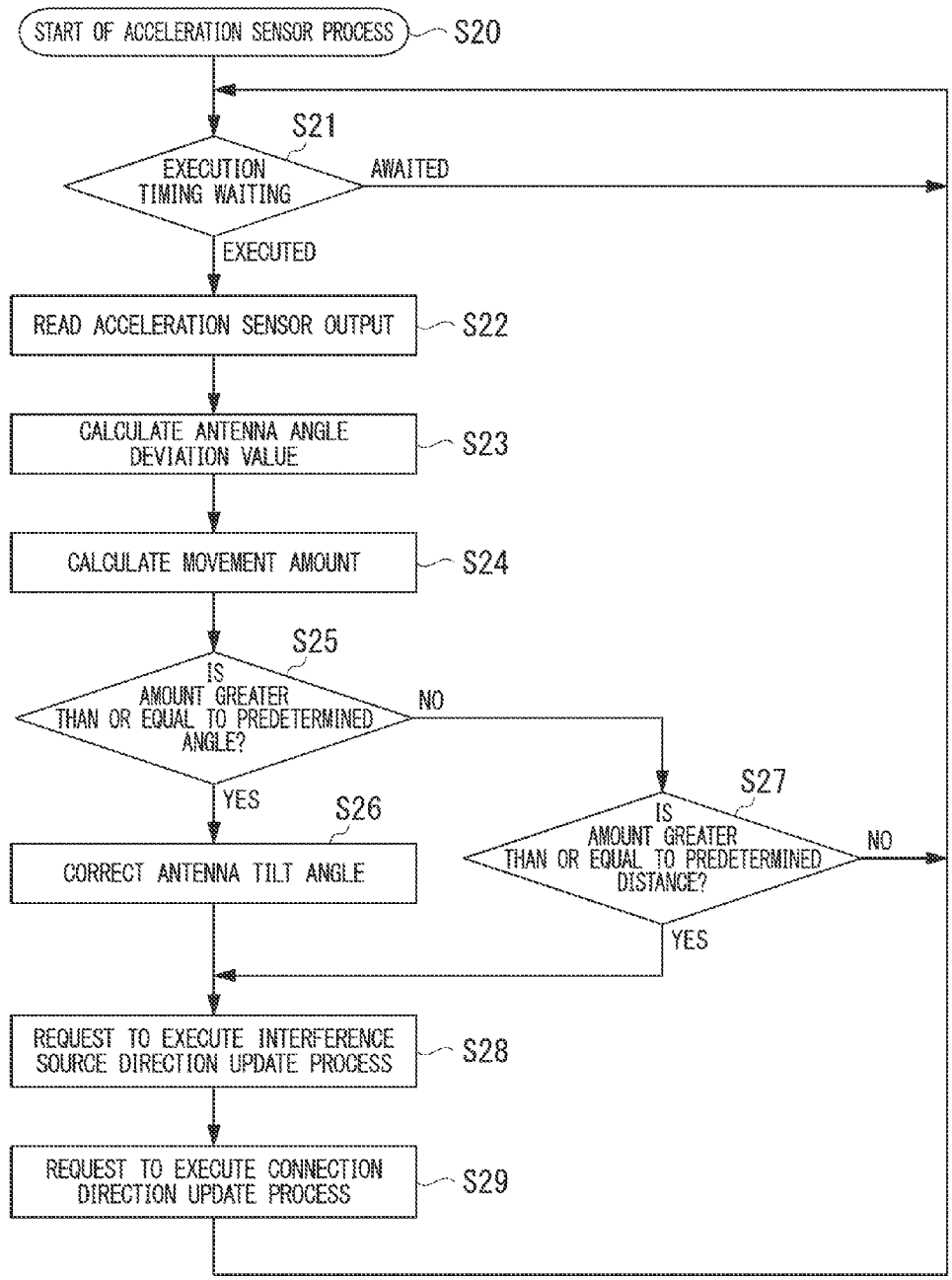
FIG. 8 is a flowchart illustrating a procedure of an operation of the reception device in the image communication system according to the embodiment of the present invention.

FIG. 8 illustrates a flow of the acceleration sensor process to be performed by the reception device 1. Using FIG. 8, the acceleration sensor process will be described in an example in which each device is arranged as in FIG. 1.

The acceleration sensor 23 detects acceleration of a three-dimensional direction involved in the reception device 1 and outputs a signal representing the detected acceleration to the reception control circuit 20. The signal output by the acceleration sensor 23 becomes a signal according to motion of the reception device 1. The reception control circuit 20 periodically reads an output of the acceleration sensor 23 and performs an acceleration sensor process S20.

In this embodiment, in order to secure detection precision, the execution cycle of the acceleration sensor process S20 is set to a shorter cycle than the image data transmission cycle (for example, the image data transmission cycle: 16.7 ms and the execution cycle of the acceleration sensor process: 1 ms). In addition, because the acceleration sensor process S20 is executed in a predetermined cycle based on the time measured by the timer embedded in the reception device 1, the acceleration sensor process S20 is executed to be asynchronous with the reception process S11.

In the acceleration sensor process S20, the reception control circuit 20 initially performs execution timing waiting S21 for awaiting the start of the process using the built-in timer, and performs acceleration sensor output reading S22 in a predetermined cycle. In the acceleration sensor output reading S22, the reception control circuit 20 reads the output from the acceleration sensor 23.

Subsequently, the reception control circuit 20 performs antenna angle deviation amount calculation S23 of calculating the tilt angle variation amount of the antenna 2. Thereafter, the reception control circuit 20 performs movement amount calculation S24 of calculating a movement amount of the reception device 1. In the antenna angle deviation amount calculation S23 and the movement amount calculation S24, the tilt angle variation amount or the movement amount is calculated from the output of the acceleration sensor 23. However, because a method of calculating the tilt angle variation amount or the movement amount from a three-dimensional acceleration sensor output is well known, specific description thereof will be omitted.

Subsequently, the reception control circuit 20 makes a tilt angle determination S25 of determining whether the tilt angle variation amount obtained in the antenna angle deviation amount calculation S23 is greater than or equal to a predetermined angle. The predetermined angle serving as the threshold value of the tilt angle determination S25 differs according to whether the precision of the directivity control of the antenna 2 is normal or high. When the precision of the directivity control of the antenna 2 is high, the predetermined angle is set to be narrower than when the precision of the directivity control of the antenna 2 is normal. When the tilt angle variation amount is greater than or equal to the predetermined angle, the reception control circuit 20 performs antenna tilt angle correction S26 of correcting the directivity angle of the antenna 2 via the phase control circuit 21.

The antenna tilt angle correction S26 is a process of correcting the directivity direction of the antenna 2 during communication according to a tilt angle variation amount obtained in the antenna angle deviation amount calculation S23. This process is a process of correcting the directivity direction of the antenna 2 during data communication before the interference source direction update process S13 and the connection direction update process S15 to be performed in the blanking period after the image data communication when the reception device 1 has been tilted during the image data communication. This process is possible because the execution cycle of the acceleration sensor process S20 is shorter than the transmission cycle of the image data communication.

When the tilt angle variation amount is less than a predetermined angle in the tilt angle determination S25, the reception control circuit 20 makes a movement distance determination S27 of determining whether the movement amount obtained in the movement amount calculation S24 is greater than or equal to a predetermined distance. The predetermined distance serving as the threshold value of the movement distance determination S27 also differs according to whether the precision of the directivity control of the antenna 2 is normal or high. When the precision of the directivity control of the antenna 2 is high, the predetermined distance is set to be shorter than when the precision of the directivity control of the antenna 2 is normal.

When the movement amount is less than the predetermined distance, the reception control circuit 20 performs the execution timing waiting S21. When the movement amount is greater than or equal to the predetermined distance in the movement distance determination S27 and when the antenna tilt angle correction S26 is executed, the reception control circuit 20 performs an interference source direction update process execution request S28 and a connection direction update process execution request S29. The interference source direction update process execution request S28 is a process of generating a movement-time interference source update instruction which is an execution instruction of the interference source direction update process S13. The connection direction update process execution request S29 is a process of generating the movement-time connection partner update instruction which is the execution instruction of the connection direction update process S15. Thereafter, the reception control circuit 20 performs the execution timing waiting S21.

Figure 9:
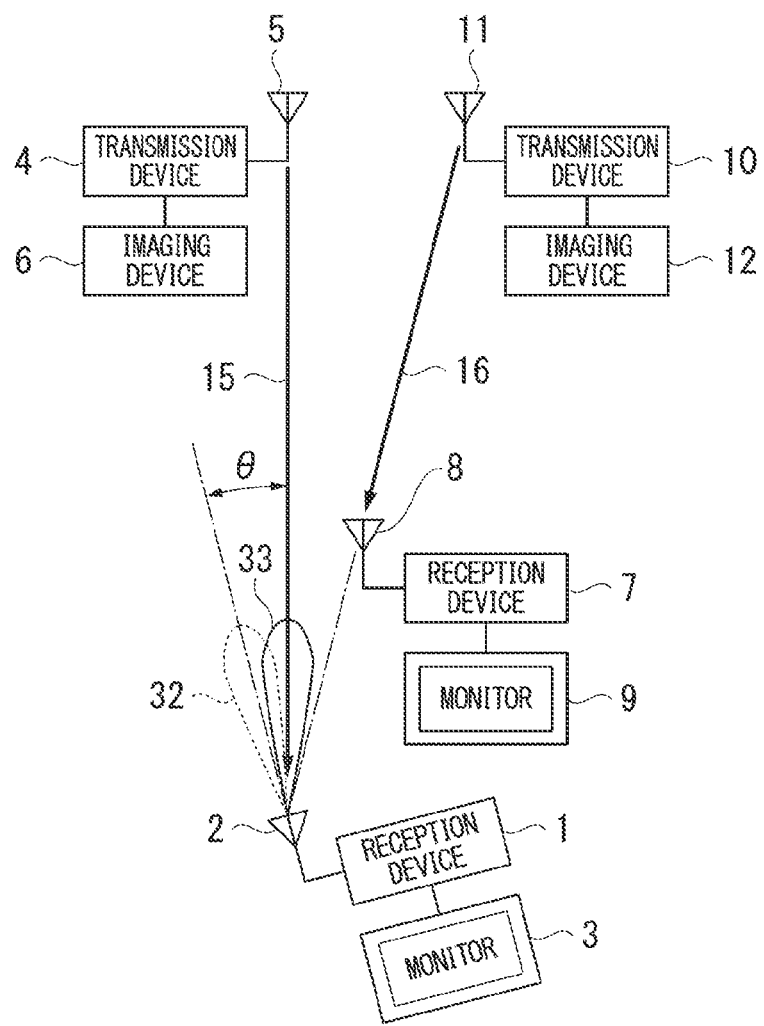
FIG. 9 is a block diagram illustrating tilt angle correction to be performed by the reception device in the image communication system according to the embodiment of the present invention.

FIG. 9 illustrates tilt angle correction to be performed when the antenna 2 of the reception device 1 has been tilted. As described above, the tilt of the antenna 2 of the reception device 1 is detected in the acceleration sensor process S20 and the antenna tilt angle correction S26 is executed. FIG. 9 illustrates a state in which the reception device 1 during image data reception in the state of FIG. 1 has been tilted −15 degrees from the state of FIG. 1. When the tilt is detected, the antenna tilt angle correction S26 is executed and the directivity direction (directional pattern 32) which is the direction of 90 degrees is updated to the direction (directional pattern 33) of 105 degrees, and therefore the reception of the image data is continued without causing a problem due to the tilt. In the blanking period after the reception of the image data has ended, the interference source direction update process S13 and the connection direction update process S15 are executed and data of the direction of the radio wave interference source and the direction of the connection partner is updated.

Figure 10:
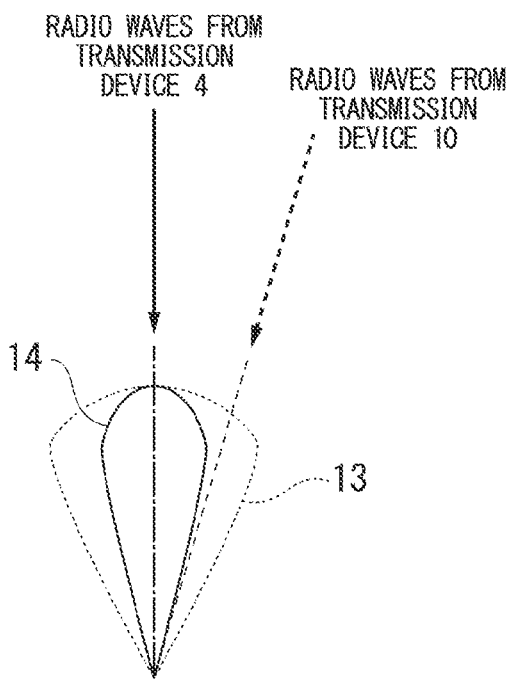
FIG. 10 is a reference diagram illustrating a directional pattern of an antenna of the reception device in the image reception system according to the embodiment of the present invention.
Figure 11:
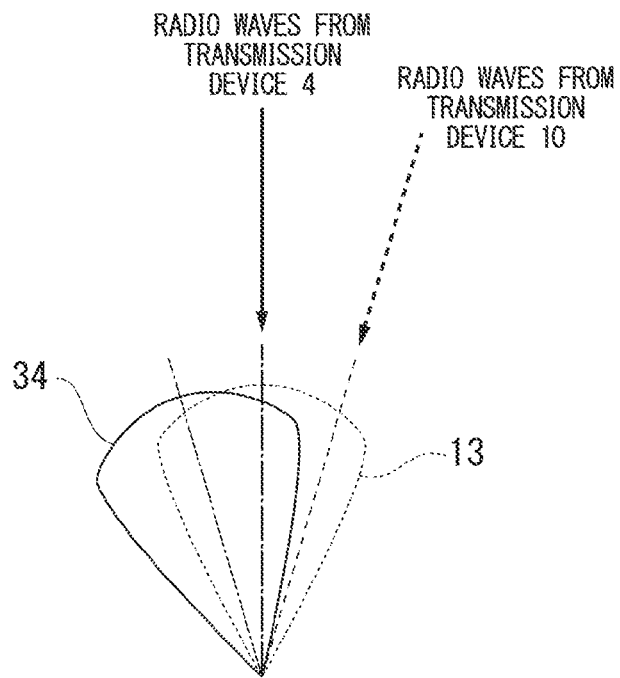
FIG. 11 is a reference diagram illustrating a directional pattern of the antenna of the reception device in the image reception system according to the embodiment of the present invention.

FIGS. 10 and 11 are examples of directional patterns during reception of image data when the precision of the directivity control of the antenna 2 is high. FIGS. 10 and 11 also illustrate directional patterns of the antenna 2 in a state in which each device is arranged as in FIG. 1. In the antenna control update process S17, the directional pattern of the antenna 2 is controlled according to methods illustrated in FIGS. 10 and 11.

FIG. 10 is an example of the directional pattern in which the directivity angle is narrowed more than when the precision of the directivity control of the antenna 2 is normal. The same directional pattern 14 as those of FIGS. 1 and 3 is disclosed.

The interference radio wave is suppressed by narrowing the directivity angle more than in the normal case.

FIG. 11 illustrates a method which is not described above. This method is a method of preventing radio waves from the radio wave interference source from being received by shifting the directivity direction with the directivity angle maintained at the same directivity angle as that when the precision of the directivity control of the antenna 2 is normal. In FIG. 11, the direction of the connection partner is detected as 90 degrees. However, because the direction of the radio wave interference source is 105 degrees, the directivity direction of the antenna 2 is set to 75 degrees instead of 90 degrees.

In FIG. 11, a directional pattern 34 when the above-described angle adjustment has been performed is illustrated. The directivity direction of the antenna 2 is tilted in a direction away from the radio wave interference source with the direction of the connection partner maintained within a range of a half-value angle of the antenna 2. Thereby, the direction of the radio wave interference source is out of the range of the half-value angle of the antenna 2. Through this angle adjustment, the direction of the connection partner is included in the half-value angle of the antenna 2, so that the reception sensitivity is secured, and the interference radio waves are suppressed because the radio wave interference source is out of the half-value angle of the antenna 2.

The function of the reception device 1 is implemented by causing the reception control circuit 20 which is a computer of the reception device 1 to read and execute a program for controlling the operation of the reception control circuit 20.

In addition, the program for controlling the operation of the reception control circuit 20, for example, may be provided by a "computer-readable recording medium" such as a flash memory. In addition, the above-described program may be transmitted from a computer system storing the program in a storage device or the like via a transmission medium or transmitted to another computer system by transmission waves in a transmission medium. Here, the "transmission medium" refers to a medium having a function of transmitting information, such as a network (communication network) like the Internet or a communication circuit (communication line) like a telephone circuit. In addition, the above-described program may be a program for implementing some of the above-described processes. Further, the above-described program may be a program capable of implementing the above-described processes in combination with a program already recorded on a computer system, i.e., a so-called differential file (differential program).

As described above, according to this embodiment, it is possible to detect the direction of the connection partner with high precision by narrowing the directivity angle of the antenna more when the process of detecting the direction of the connection partner is performed by setting the directivity direction of the antenna in the vicinity of the direction of the radio wave interference source than when the process of detecting the direction of the connection partner is performed by setting the directivity direction of the antenna to a direction which is not the vicinity of the direction of the radio wave interference source. In addition, it is possible to perform stable wireless communication by controlling the directivity direction of the antenna so as to suppress the influence of the radio waves from the radio wave interference source when image data is received in the case in which the direction of the connection partner is the vicinity of the direction of the radio wave interference source.

In addition, when the process of detecting the direction of the connection partner is performed by setting the directivity direction of the antenna in the vicinity of the direction of the radio wave interference source, the precision of the directivity control of the antenna is high and the directivity angle is narrowed. Because of this, it is possible to prevent a beam from being deviated according to movement of the connection partner by performing the process of detecting the direction of the connection partner in a short cycle with high precision.

In addition, it is possible to detect movement of the reception device by providing an acceleration sensor. Further, the direction of the radio wave interference source and the direction of the connection partner are detected when the movement of the reception device has been detected. Thereby, it is possible to start the process of updating the directivity direction of the antenna immediately after the movement of the reception device and minimize the influence on communication due to movement of the reception device. Further, because communication is performed in a state in which the beam is further narrowed when the direction of the connection partner is the vicinity of the direction of the radio wave interference source, the direction of the connection partner is detected even at the time of a small amount of movement of the reception device. Thereby, it is possible to prevent the beam from being deviated according to movement of the reception device.

In addition, it is possible to shorten a processing time by detecting the variation of the direction of the reception device (antenna) from the output of the acceleration sensor and setting detection ranges of the directions of the radio wave interference source and the connection partner using a detection result.

In addition, it is possible to prevent the beam from being deviated by calculating a tilt angle variation amount of the antenna from the output of the acceleration sensor and correcting the directivity direction of the antenna when the tilt angle variation amount has exceeded a predetermined amount.

In addition, even when the direction of the connection partner is substantially the same as the direction of the radio wave interference source, image data is received by narrowing the directivity angle of the antenna more than the normal directivity angle. Thereby, it is possible to reliably perform wireless communication with a connection partner by suppressing the influence of the interference radio waves from the radio wave interference source.

Because a plurality of devices are used for the same patient in a medical site, the case in which the device serving as the radio wave interference source and the device of the connection partner are at the same position is rare. Because of this, when the device of the communication partner moves, the device of the communication partner is likely to move in a direction in which there is no device serving as the radio wave interference source. Therefore, it is possible to perform stable wireless communication even when the device of the connection partner moves by pre-shifting the directivity direction of the antenna in a direction in which the device of the connection parent is likely to move. Further, an effect of reducing the influence of the radio wave interference source can also be expected by shifting the directivity direction of the antenna away from the direction of the radio wave interference source because the reception sensitivity rapidly decreases out of the half-value angle of the antenna.

In addition, by issuing a warning when the direction of the connection partner is the vicinity of the direction of the radio wave interference source, it is possible to issue a notification of the possibility of occurrence of a communication failure due to radio wave interference and support a change in a position of the radio wave interference source or the connection partner.

Although the embodiments of the present invention have been described in detail above with reference to the drawings, specific configurations are not limited to the above-described embodiments and the present invention is not limited to the embodiments. A design change, etc. can also be included without departing from the spirit or scope of the present invention.

The present invention is applicable to a wireless communication device, a wireless communication system, an antenna control method, and a program in which it is possible to detect a direction of the wireless communication device of a connection partner with high precision by narrowing a directivity angle of a directional antenna to perform a second detection process more when the second detection process is performed by setting the directivity direction of the directional antenna in the vicinity of a first direction than when the second detection process is performed by setting the directivity angle of the directional antenna to a direction other than the vicinity of the first direction.

In addition, the present invention is applicable to a wireless communication device, a wireless communication system, an antenna control method, and a program in which stable wireless communication can be performed by controlling the directivity direction of the directional antenna so as to suppress an influence of radio waves from a radio wave generation source at the time of receiving data when the second direction is the vicinity of the first direction.

What is claimed is:

1. A wireless communication device comprising:
a directional antenna configured to wirelessly receive data from a wireless communication device which is a connection partner;
a control circuit configured to perform a first detection process of controlling a directivity direction of the directional antenna and detecting a first direction which is a direction of a radio wave generation source other than the wireless communication device and a second detection process of controlling the directivity direction of the directional antenna and detecting a second direction which is a direction of the wireless communication device; and
the control circuit further configured to set a directivity angle of the directional antenna to a narrower angle when the second detection process is performed in a range included in a directional angle of a directional pattern of the directional antenna of the first direction than when the second detection process is performed in a direction not in the range included in the directional angle of the directional pattern of the directional antenna of the first direction, and to control the directivity direction of the directional antenna to suppress an influence of radio waves from the radio wave generation source at the time of receiving the data when the second direction is in the range included in the directional angle of the directional pattern of the directional antenna of the first direction,
wherein the second detection process is performed after the first detection process.

2. The wireless communication device according to claim 1, wherein
the directional antenna wirelessly receives image data from the wireless communication device in predetermined cycles, and
the control circuit performs the first or second detection process in a term from the end of transmission of image data for one screen until the start of transmission of image data for the next screen.

3. The wireless communication device according to claim 1, wherein,
when the detected second direction is in the range included in the directional angle of the directional pattern of the directional antenna of the first direction after the first and second detection processes are performed, the control circuit increases a frequency at which the first or second detection process is performed more than when the detected second direction is a direction not in the range included in the directional angle of the directional pattern of the directional antenna of the first direction.

4. The wireless communication device according to claim 1, further comprising:
a sensor configured to detect movement of the device and output a movement signal according to the movement,
wherein the control circuit calculates a movement amount of the device based on the movement signal after the first and second detection processes are performed and performs either the first or second detection process when the movement amount has exceeded a predetermined amount.

5. The wireless communication device according to claim 4, wherein, when the detected second direction is in the range included in the directional angle of the directional pattern of the directional antenna of the first direction, the control circuit sets the predetermined amount to a smaller amount than when the detected second direction is a direction not in the range included in the directional angle of the directional pattern of the directional antenna of the first direction.

6. The wireless communication device according to claim 4, wherein
after the first and second detection processes are performed the control circuit calculates a variation amount of a direction of the device based on the movement signal and uses the calculated variation amount for setting a detection range in either the first or second detection process.

7. The wireless communication device according to claim 1, further comprising:
a sensor configured to detect movement of the device and output a movement signal according to the movement,
wherein after the first and second detection processes are performed the control circuit calculates a variation amount of the directivity direction of the directional antenna based on the movement signal and corrects the directivity direction of the directional antenna when the variation amount has exceeded a predetermined amount.

8. The wireless communication device according to claim 1, wherein,
when the detected second direction is in the range included in the directional angle of the directional pattern of the directional antenna of the first direction, the control circuit further narrows a directivity angle of the directional antenna at the time of receiving the data to a narrower angle than when the detected second direction is a direction not in the range included in the directional angle of the directional pattern of the directional antenna of the first direction.

9. The wireless communication device according to claim 1, wherein
the control circuit sets the directivity direction of the directional antenna so that the first direction is deviated from a half-value angle of the directional antenna when the detected second direction is in the range included in the directional angle of the directional pattern of the directional antenna of the first direction.

10. The wireless communication device according to claim 1, further comprising:
a warning device configured to issue a warning when the detected second direction is in the range included in the directional angle of the directional pattern of the directional antenna of the first direction.

11. A wireless communication system comprising:
a first wireless communication device having a first directional antenna configured to wirelessly transmit data; and
a second wireless communication device having:
a second directional antenna configured to wirelessly receive data from the first wireless communication device;
a control circuit configured to perform a first detection process of controlling a directivity direction of the second directional antenna and detecting a first direction which is a direction of a radio wave generation source other than the first wireless communication device and a second detection process of controlling the directivity direction of the second directional antenna and detecting a second direction which is a direction of the first wireless communication device; and the control circuit further configured to set a directivity angle of the second directional antenna to a narrower angle when the second detection process is performed in a range included in a directional angle of a directional pattern of the directional antenna of the first direction than when the second detection process is performed in a direction not in the range included in the directional angle of the directional pattern of the directional antenna of the first direction, and to control the directivity direction of the second directional antenna to suppress an influence of radio waves from the radio wave generation source at the time of receiving the data when the second direction is in the range included in the directional angle of the directional pattern of the directional antenna of the first direction, wherein the second detection process is performed after the first detection process.

12. A computer readable storage device saving a computer program for causing a computer of a wireless communication device having a directional antenna configured to wirelessly receive data from a wireless communication device which is a connection partner to:

execute a first detection process of controlling a directivity direction of the directional antenna and detecting a first direction which is a direction of a radio wave generation source other than the wireless communication device; and a second detection process of controlling the directivity direction of the directional antenna and detecting a second direction which is a direction of the wireless communication device, and set a directivity angle of the directional antenna to a narrower angle when the second detection process is performed in a range included in a directional angle of a directional pattern of the directional antenna of the first direction than when the second detection process is performed the range included in the directional angle of the directional pattern of the directional antenna of the first direction and control the directivity direction of the directional antenna to suppress an influence of radio waves from the radio wave generation source at the time of receiving the data when the second direction is in the range included in the directional angle of the directional pattern of the directional antenna of the first direction, wherein the second detection process is performed after the first detection process.

* * * * *